United States Patent
Chen

(10) Patent No.: US 8,267,488 B2
(45) Date of Patent: Sep. 18, 2012

(54) FRAME ASSEMBLY FOR REFLECTIVE CABINET DOOR

(75) Inventor: Yun-Lu Chen, Ping-Tung (TW)

(73) Assignee: Danny Plastics Co., Ltd., Shin-Yuan Hsiang, Ping-Tung (TW)

( * ) Notice: Subject to any disclaimer, the term of this patent is extended or adjusted under 35 U.S.C. 154(b) by 448 days.

(21) Appl. No.: 12/603,568

(22) Filed: Oct. 21, 2009

(65) Prior Publication Data

US 2011/0089796 A1  Apr. 21, 2011

(51) Int. Cl.
*A47B 67/00* (2006.01)

(52) U.S. Cl. ........................ 312/227; 312/304

(58) Field of Classification Search ............... 52/204.71, 52/656.5, 656.6, 716.8, 717.01, 800.12–800.14; 312/227, 304; 49/501, 504
See application file for complete search history.

(56) References Cited

U.S. PATENT DOCUMENTS

| | | | | |
|---|---|---|---|---|
| 3,438,166 A * | 4/1969 | Bakke | ...................... | 52/204.597 |
| 4,004,389 A * | 1/1977 | DiFazio | ................... | 52/204.593 |
| 4,098,027 A * | 7/1978 | Crance | ........................... | 49/504 |
| 4,148,535 A * | 4/1979 | Fenwick | ...................... | 312/304 |
| 4,274,688 A * | 6/1981 | Zacky | ........................... | 312/304 |
| 5,139,322 A * | 8/1992 | Aisley | ........................... | 312/351 |
| 5,380,080 A * | 1/1995 | Rubin et al. | .................. | 312/128 |
| 5,887,959 A * | 3/1999 | Yuri | ............................... | 312/7.2 |
| 6,625,941 B2 * | 9/2003 | Shaw | ............................. | 52/211 |
| 7,950,192 B2 * | 5/2011 | Glover et al. | ............ | 52/204.593 |
| 2007/0160804 A1 * | 7/2007 | Richardson | ................... | 428/122 |
| 2008/0256897 A1 * | 10/2008 | Lowry et al. | ............... | 52/800.13 |

* cited by examiner

*Primary Examiner* — Hanh V Tran
(74) *Attorney, Agent, or Firm* — Alan Kamrath; Kamrath IP Lawfirm, PA

(57) ABSTRACT

A frame assembly for a reflective cabinet door includes at least two vertical strips, two transverse strips and one supporting strip. In particular, a frame is co-extruded by rigid and soft plastic. The vertical strip and transverse strip both have an embedding area having cushion bars arranged to two sides of an inlet of a gap. The supporting strip is transversely fixed between two vertical strips by screws to provide support to the frame. A transparent or reflective plate is embedded into the gaps of the vertical and transverse strips, and the cushion bars will provide cushion and protection against vibration and slippage. The frame can be slid along upper and lower guides in a cabinet through sliding components arranged to four corners of the frame. In addition, the frame can be applied to a door plate or a partition plate of a cabinet.

6 Claims, 6 Drawing Sheets

FRAME ASSEMBLY FOR REFLECTIVE CABINET DOOR

FIELD OF THE PRESENT INVENTION

The present invention relates to a reflective cabinet door frame and, in particular, to a frame co-extruded by rigid and soft plastic providing cushion and protection against slippage.

DESCRIPTION OF THE PRIOR ART

For the purpose of effective space usage, a closet 10 in a bedroom usually has a reflective plate 12 arranged on a closet door 11 for dressing, as shown in FIG. 1. Such arrangement is great and suits the need but still has disadvantages. Firstly, prior frames of the reflective plate 12 made by electroplate metal or painted metal will have a rustiness issue. Secondly, metal has a cold appearance, especially in winter time. Thirdly, children might get hurt by rigid metal. Fourthly, heavy metal frames will cause trouble while transferring or assembling.

SUMMARY OF THE PRESENT INVENTION

Accordingly, the primary object of the present invention is to provide a reflective cabinet door frame made by co-extrusion with rigid and soft plastic. Plastic is not as rigid as metal to hold the plate, but the soft face of the extruded frame will provide cushion and protection against slippage and breakage. The rigid frame and soft cushion made by co-extrusion will overcome the weakness of plastic.

To achieve the above object, the present invention provides a door frame including two vertical strips, two transverse strips and at least one supporting strip. The long vertical strip and transverse strip both have an embedding area. The embedding area has a gap, and cushion bars are arranged to two sides of an inlet of the gap. The supporting strip is transversely fixed between two vertical strips by screws to provide support to the frame. A transparent or reflective plate, which can also be any plate having a reflective surface, is embedded into the gaps of the vertical strips and the transverse strips, and the cushion bars will provide cushion and protection against vibration and slippage.

DETAILED DESCRIPTION OF THE INVENTION

In order that those skilled in the art can further understand the present invention, a detailed description will be provided. However, these descriptions and the appended drawings are only used to cause those skilled in the art to understand the objects, features, and characteristics of the present invention, but not to be used to confine the scope and spirit of the present invention defined in the appended claims.

Figure 1:
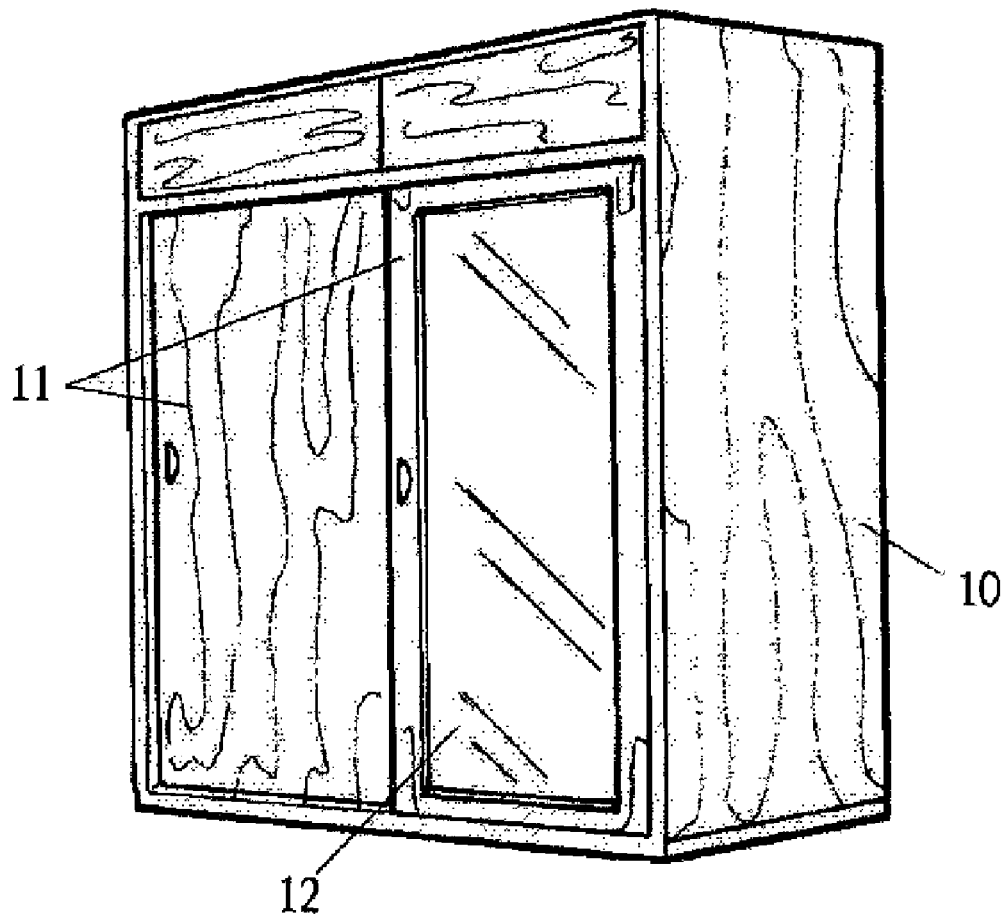
FIG. 1 is a schematic view showing a prior closet.
Figure 2:
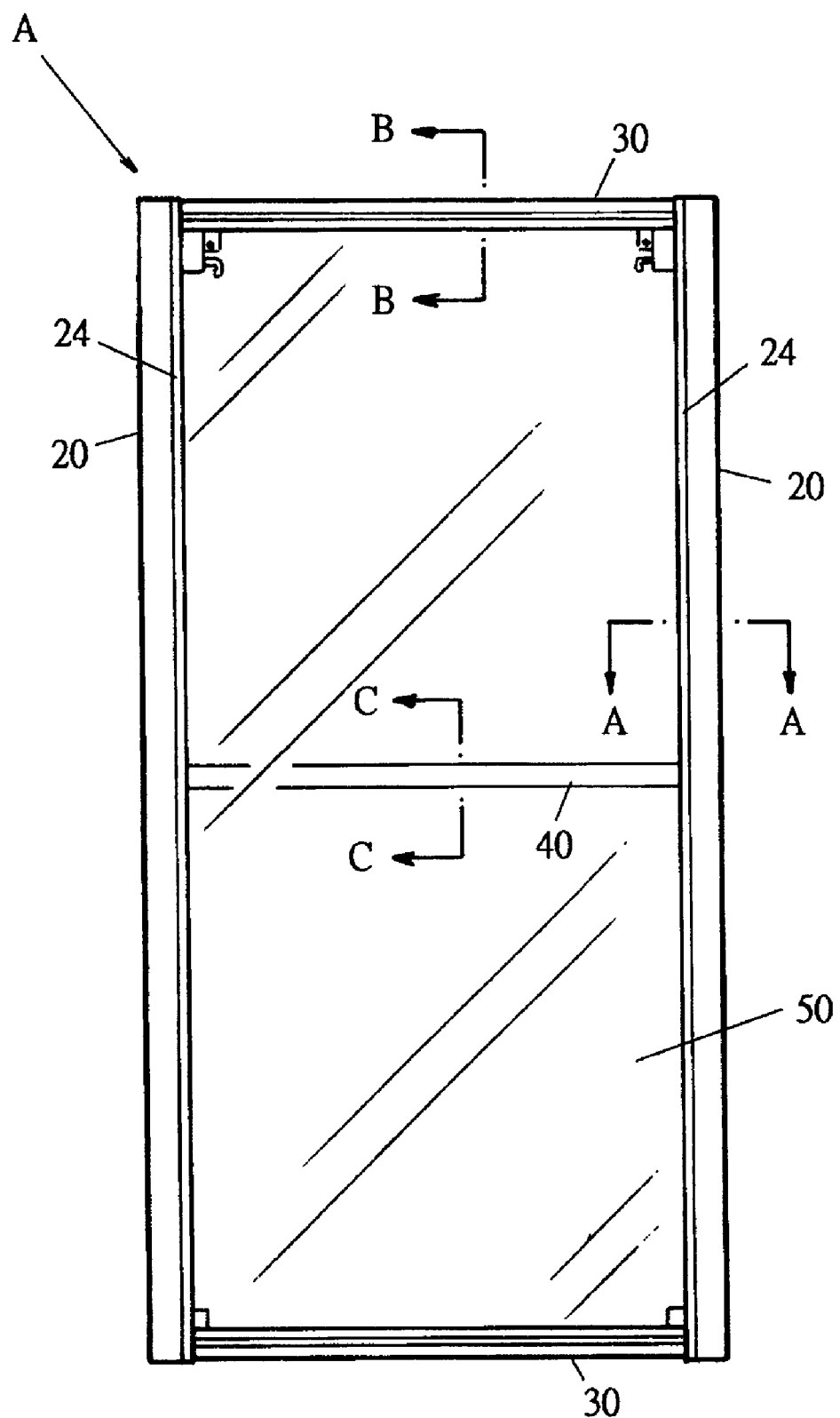
FIG. 2 is a plain view showing a mirror frame of the present invention.

With reference to FIG. 2, the present invention includes two vertical strips 20, two transverse strips 30, and at least one supporting strip 40. All the strips are extruded plastic. A rectangular mirror frame A is formed by the two vertical strips 20 and the two transverse strips 30, and a reflective plate 50 is embedded within the mirror frame A.

Figure 3:
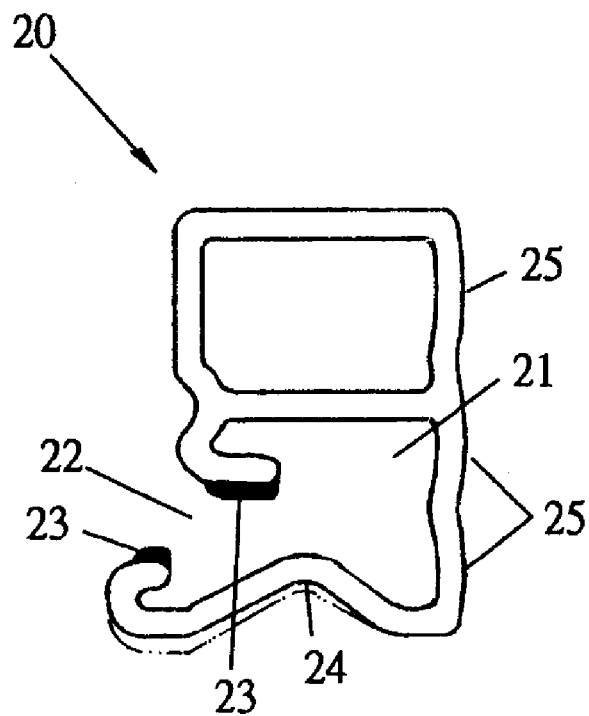
FIG. 3 is a cross section view showing a vertical strip of the present invention.
Figure 4:
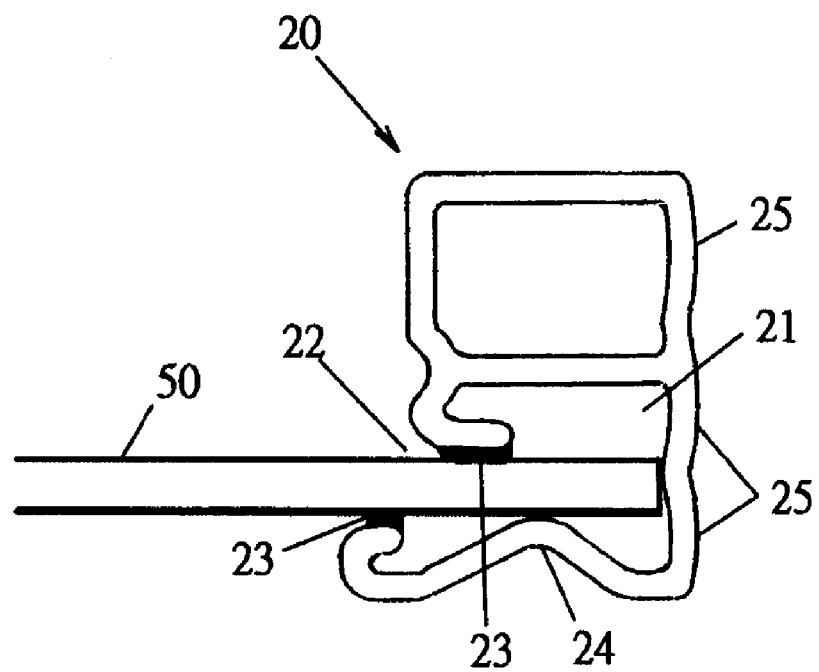
FIG. 4 is a cross section view through an A-A line in FIG. 2 showing an embedded reflective plate in the vertical strip of the present invention.

Referring to FIGS. 3 and 4, the cross section views of the long vertical strip 20 are illustrated. An embedding area 21 is formed to an inner side of the vertical strip 20. The embedding area has a gap 22, and cushion bars 23 are arranged to two sides of an inlet of the gap 22. The cushion bars 23 are formed integral to the vertical strip 20 by co-extrusion, and the cushion bars 23 are made by softer plastic. A concave portion 24 is formed to a front side of the vertical strip 20, and the rear side of the concave portion 24 protrudes into the embedding area 21. The concave portion 24 can be moved by finger. An outer lateral side of the vertical strip 20 has a curve edge 25 which can provide support to the concave portion 24. Therefore, the reflective plate 50 is embedded into the gap 22 with a predetermined depth. A width of the gap 22 is smaller than a thickness of the reflective plate 50 so that the embedding area 21 can hold the reflective plate 50. A rear side of the concave portion 24 will push against the reflective plate 50 so that the cushion bars 23 will also hold the reflective plate 50 and provide cushion and protection against vibration and slippage.

Figure 5:
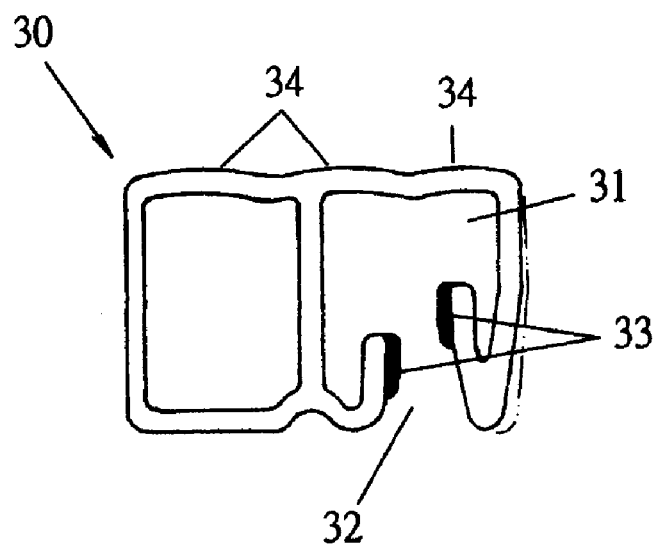
FIG. 5 is a cross section view showing a transverse strip of the present invention.
Figure 6:
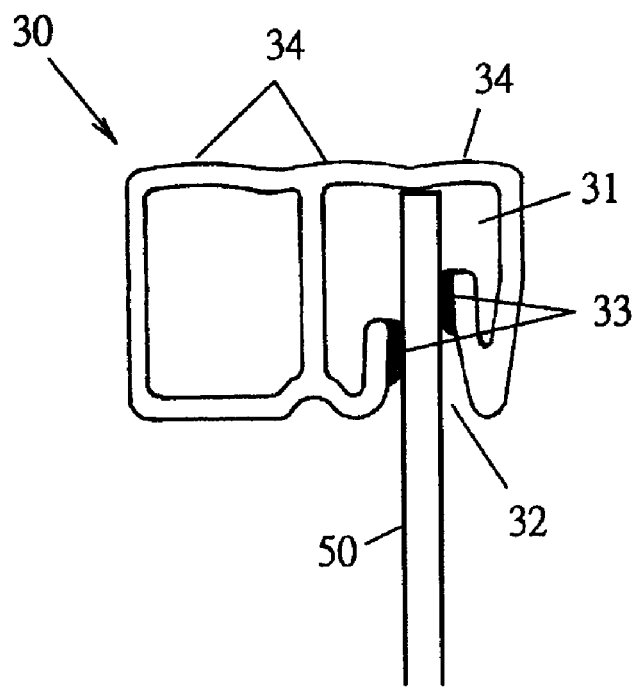
FIG. 6 is a cross section view through a B-B line in FIG. 2 showing the embedded reflective plate in the transverse strip of the present invention.

Referring to FIGS. 5 and 6, the cross section views of the long transverse strip 30 are illustrated. An inner side of the transverse strip 30 has an embedding area 31. The embedding area 31 has a gap 32, and cushion bars 33 are arranged to two sides of an inlet of the gap 32. The cushion bars 33 are formed integral to the transverse strip 30 by co-extrusion, and the cushion bars 33 are made by softer plastic. An outer side of the transverse strip 30 has a curve edge 34 which can provide support to the transverse strips 30. Therefore, the reflective plate 50 is embedded into the gap 32 with a predetermined depth. A width of the gap 32 is smaller than the thickness of the reflective plate 50 so that the embedding area 31 can hold the reflective plate 50. The cushion bars 33 will also hold the reflective plate 50 and provide cushion and protection against vibration and slippage.

Figure 7:
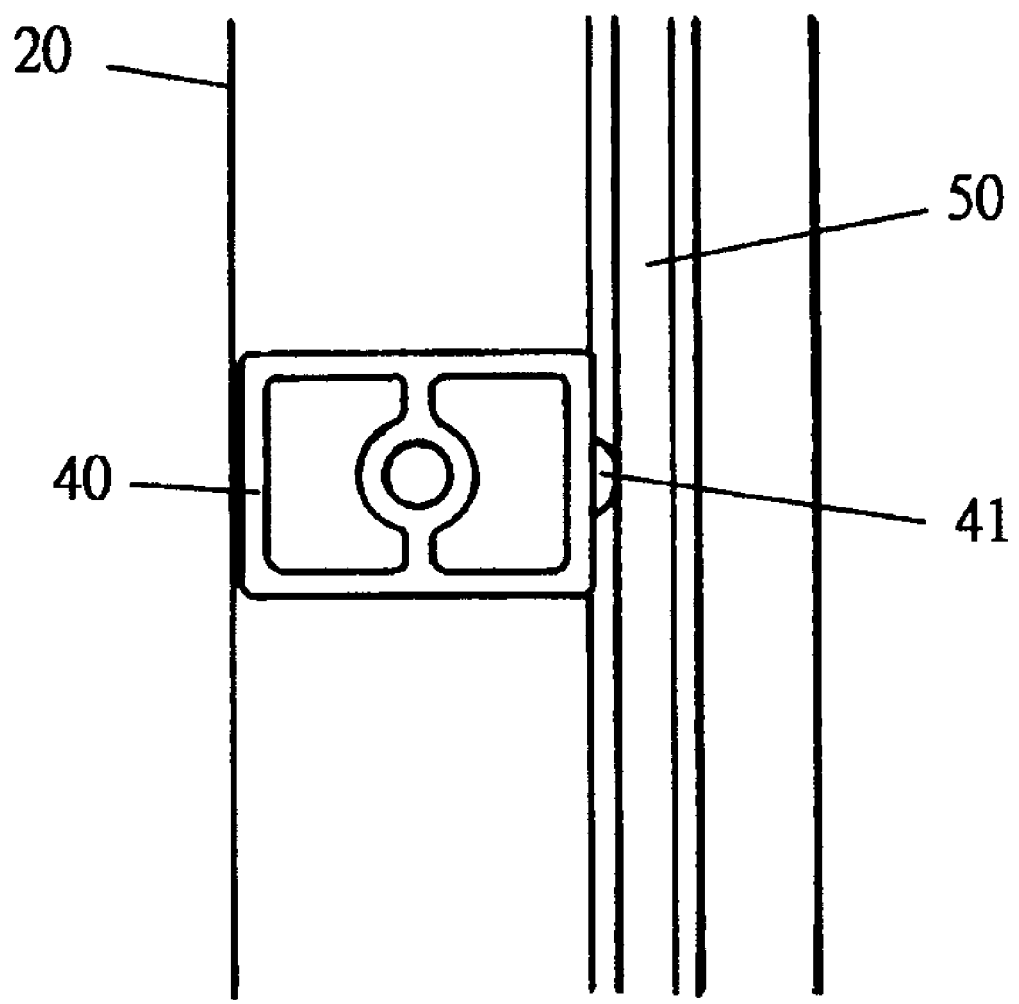
FIG. 7 is a cross section view through a C-C line in FIG. 2 showing the supporting strip of the present invention.

Referring to FIG. 7, a cross section view of the long supporting strip 40 is illustrated. A cushion belt 41 is arranged to a lateral side of the supporting strip 40. The cushion belt 41 is formed integral to the supporting strip 40 by co-extrusion, and the cushion belt 41 is made by a softer plastic. The supporting strip 40 can be transversely fixed between two vertical strips 20 by screws to provide support to the mirror frame A formed by the vertical strip 20 and the transverse strip 30. The cushion belt 41 can push against the reflective plate 50 to make the reflective plate 50 stable.

Through the above structure, the mirror frame A can be formed by two vertical strips 20 and two transverse strips 30. The supporting strip 40 fixed between the two vertical strips 20 will firm up the mirror frame A. The reflective plate 50 can be embedded into the gaps 22, 32 of the embedding area 21, 31 of the vertical strip 20 and the transverse strip 30. By the smaller widths of the gaps 22 and 32 than the thickness of the reflective plate 50, the embedded reflective plate 50 will be held stably by the vertical strip 20 and the transverse strip 30. Also, the cushion bars 23 and 33 will provide cushion and protection against vibration and slippage.

Figure 8:
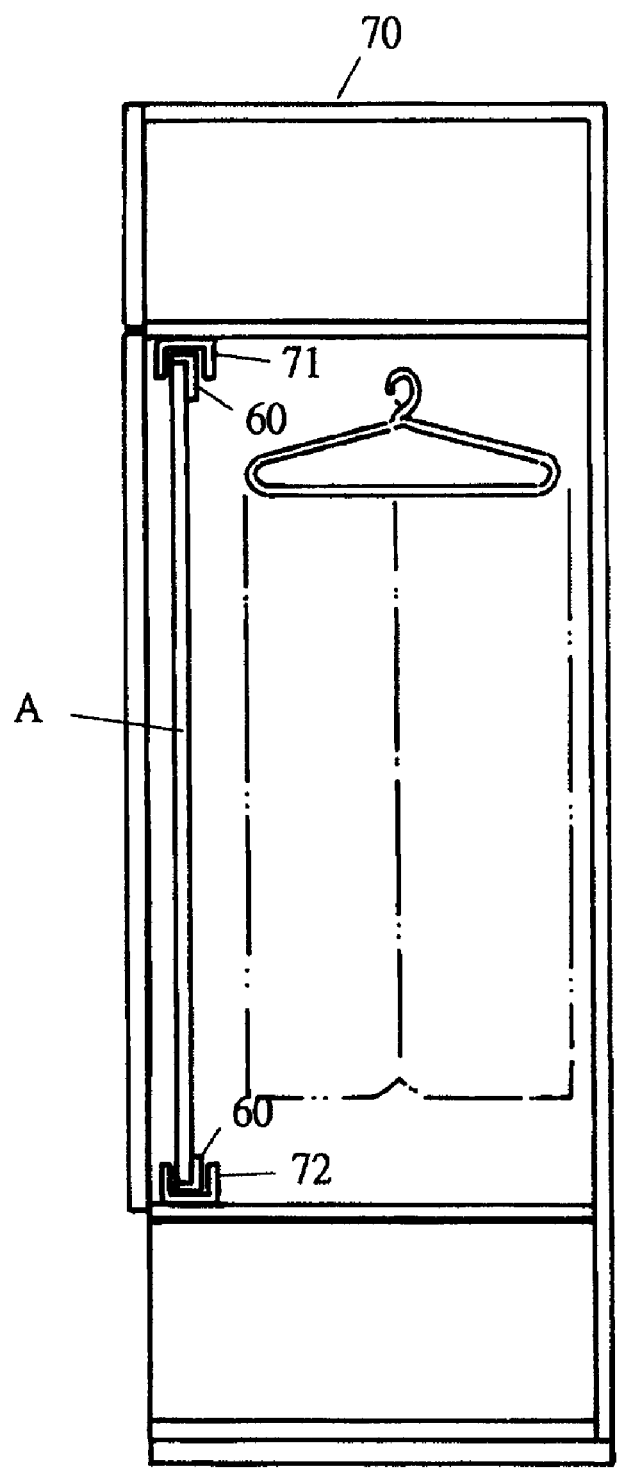
FIG. 8 is a prospective view showing the present invention arranged in a cabinet.

With reference to FIGS. 2 and 8, the mirror frame A formed by two vertical strips 20 and two transverse strips 30 has a sliding component 60 on four corners thereof. On a top and a bottom of a cabinet 70, an upper guide 71 and a lower guide 72 engaging the sliding components 60 are arranged so that the reflective plate 50 and the mirror frame A can be slid along the guides 71 and 72 in the cabinet by the user. By pushing the concave portion 24 of the vertical strip 20, the mirror frame A is easily moved away to access the cabinet 70. The above sliding component 60 is a preferable embodiment of the present invention. The reflective plate 50 and the mirror frame A can also be a door plate or a partition plate of the cabinet 70. The reflective plate 50 can be a transparent or reflective plate such as a mirror, glass, plastic or stainless steel having a reflective surface.

Therefore, by the assembly of the present invention holding the reflective plate 50 through the cushion bars 23 and 33 in the gaps 22 and 32 of the embedding areas 21 and 31 of the vertical strip 20 and transverse strip 30 respectively, the reflective plate 50 is protected against vibration and slippage to ensure safety.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A frame assembly for a reflective cabinet door comprising:
    two vertical strips of rigid plastic; with each vertical strip having an inner lateral side, an outer lateral side spaced from the inner lateral side, and a front side extending between the inner and outer lateral sides, with the inner and outer lateral sides and the front side defining an embedding area; with the embedding area having an inlet formed in the inner lateral side spaced from the front side, cushion bars arranged to first and second inner sides of the inlet; with the cushion bars formed integral to the vertical strip by co-extrusion, and with the cushion bars made by a plastic softer than the rigid plastic; with a concave portion formed in the front side intermediate the inner and outer lateral sides, with the concave surface having an outer surface outwardly of the embedding area for being pushed, with a rear surface spaced from and parallel to the outer surface of the concave portion protruding into the embedding area; with the outer lateral side of the vertical strip having a curve edge providing support to the concave portion;
    two transverse strips of rigid plastic; with each transverse strip having an embedding area; with the embedding area of each transverse strip having an inlet, with cushion bars arranged to two inner sides of the inlet of each transverse strip; with the cushion bars of each transverse strip formed integral to the transverse strip by co-extrusion, and with the cushion bars of each transverse strip made by a plastic softer than the rigid plastic of each transverse strip;
    at least one supporting strip extruded by plastic; and
    a transparent or reflective plate having a reflective surface;
    wherein a rectangular frame is formed by the two vertical strips, the two transverse strips and the at least one supporting strip transversely fixed between the two vertical strips by screws; with the reflective plate embedded into the inlets of the two vertical strips and the two transverse strips; with smaller widths between the inner sides of the inlets than a thickness of the reflective plate to hold the reflective plate stably; with the rear surface of the concave portion pushing against a surface of the reflective plate, with the cushion bars holding the reflective plate and providing cushion and protection against vibration and slippage.

2. The frame assembly for a reflective cabinet door as claimed in claim 1, wherein a cushion belt is arranged to a lateral side of the at least one supporting strip; wherein the cushion belt is formed integral to the supporting strip by co-extrusion, and wherein the cushion belt is made by a softer plastic than the at least one supporting strip; with the cushion belt pushing against the reflective plate to hold the reflective plate stably.

3. The frame assembly for a reflective cabinet door as claimed in claim 1, wherein the rectangular frame formed by the two vertical strips, the two transverse strips and the at least one supporting strip has a sliding component on each four corners thereof; and wherein an upper guide and a lower guide engaging the sliding components are arranged to a top and a bottom of a cabinet, with the reflective plate and the rectangular frame slidable along the upper and lower guides in the cabinet.

4. The frame assembly for a reflective cabinet door as claimed in claim 1, wherein the second inner side of the inlet of each vertical strip is located intermediate the first inner side of the inlet and the front side of each vertical strip; wherein the first inner side of the inlet of each vertical strip is located intermediate the second inner side of the inlet and a maximum extent of the rear surface of the concave portion protruding into the embedding area.

5. The frame assembly for a reflective cabinet door as claimed in claim 4, wherein the inner sides and the cushion bars of each vertical and transverse strip are parallel.

6. The frame assembly for a reflective cabinet door as claimed in claim 5, wherein the inner lateral side between the second inner side of the inlet and the front side of each vertical strip is C-shaped.

* * * * *